June 6, 1967  E. J. JUSTUS  3,323,274
VACUUM PLASTIC BOTTLE FORMING MACHINE AND METHOD
Filed Jan. 27, 1964  2 Sheets-Sheet 1
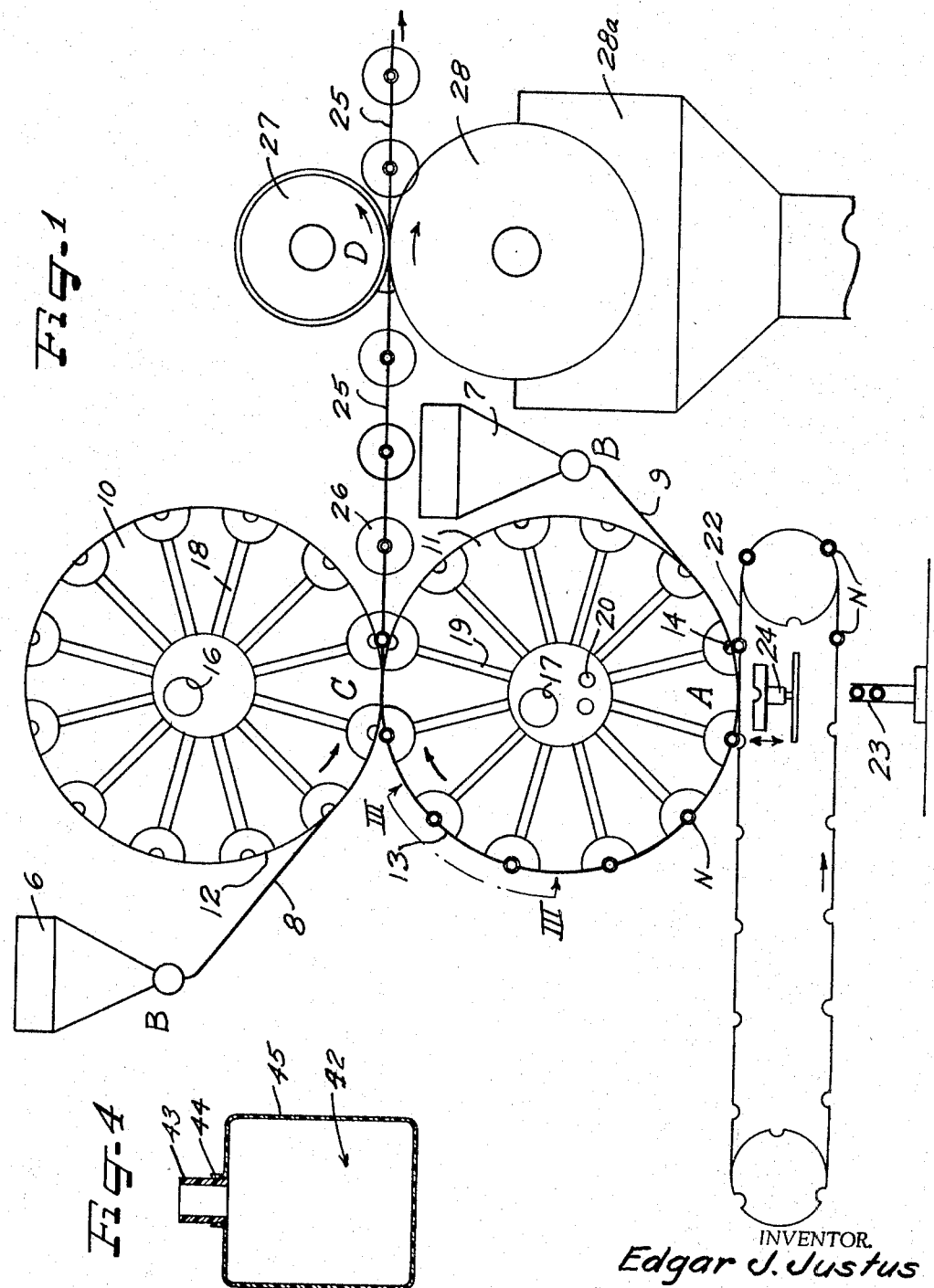
INVENTOR.
Edgar J. Justus
BY
ATTORNEYS

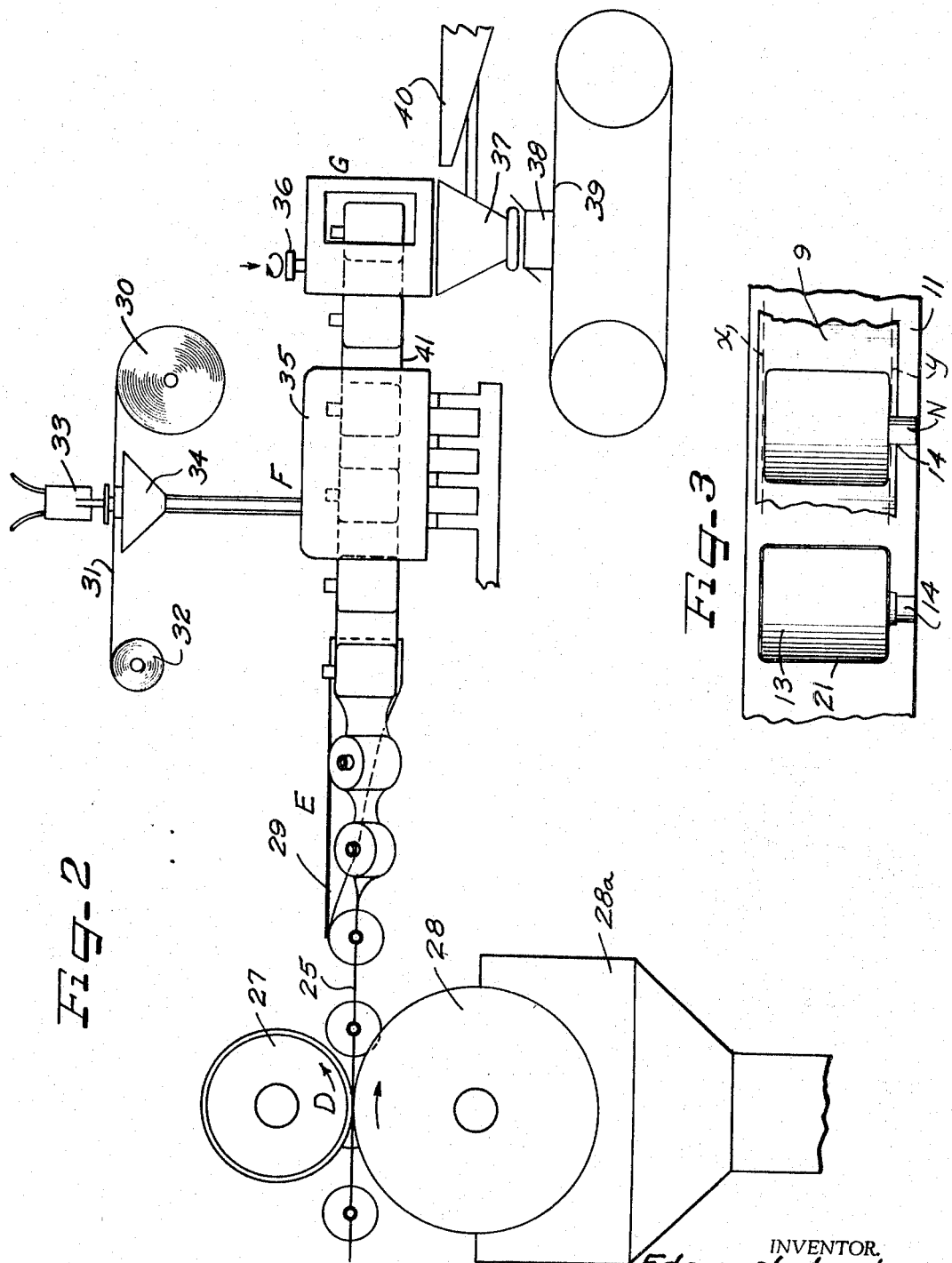

United States Patent Office 3,323,274
Patented June 6, 1967

3,323,274
VACUUM PLASTIC BOTTLE FORMING
MACHINE AND METHOD
Edgar J. Justus, Beloit, Wis., assignor to Beloit Corporation, Beloit, Wis., a corporation of Wisconsin
Filed Jan. 27, 1964, Ser. No. 340,360
11 Claims. (Cl. 53—30)

The present invention relates to improved methods and machines for making plastic bottles.

More particularly the invention embodies a method and mechanism for forming bottles out of sheets of thermoplastic material fed continuously from extruders to a forming station where the sheets are drawn into mating die sections and joined to pre-formed bottle necks which are carried to the forming station. The sections of the bottle are heat welded to each other and fed onwardly in a continuous chain with the bottles joined by web portions, with the bottom of the bottles being trimmed and the bottle chain turned upright so that the bottles are filled and capped and thereafter stripped vertically from the web and fed downwardly into a packaging conveyor.

An object of the present invention is to provide an improved method and mechanism for forming bottles continuously out of thermoplastic sheeting in a rapid, reliable, continuously moving process which manufactures, fills caps and completes the bottles in a single series of operations.

A further object of the invention is to provide an improved method and apparatus for forming bottles from sheets of thermoplastic material which forms the bottles in mating die sections and attaches a pre-formed bottle neck to the die sections at the time the bottles are formed.

A still further object of the invention is to provide an improved mechanism and method for forming thermoplastic bottles out of sheets which maintains the bottles interconnected by webs of material for expediting handling and transferrals, maintaining definite spacing between bottles, and improving the functions of filling, capping and packing.

A further object of the invention is to provide an improved thermoplastic bottle forming machine having improved features for placing the bottle in an upright position for filling and closing, and for trimming waste thermoplastic sheet from the formed bottle.

Other objects, advantages and features will become more apparent with the teaching of the principles of the present invention in conection with the disclosure of the preferred embodiment thereof in the specification, claims and drawings, in which:

FIGURE 1 is an elevational view showing the front end of a bottle forming machine constructed and operated in accordance with the principles of the present invention with features shown in somewhat schematic form;

FIGURE 2 is an elevational view similar to FIGURE 1 showing the remainder of the machine of FIGURE 1;

FIGURE 3 is a fragmentary sectional view taken substantially along line III—III of FIGURE 1; and FIGURE 4 is an elevational view of a bottle formed by the mechanism illustrated.

As shown on the drawings:

Opposed plastic sheets 8 and 9 are supplied by extruders 6 and 7 at an extruding station B to a molding station C. At the molding station opposed die halves are brought together and a pressure differential is created across each of the die halves and its individual sheet to draw the sheet into the die recess. The die recess is in the shape of one-half of a bottle and the sheets are laid over the die recesses to form the body portion only of the bottle.

The die recesses 12 and 13 are carried on the periphery of die wheels or rolls 10 and 11 which rotate at the speed at which the thermoplastic sheets 8 and 9 are fed. The sheets 8 and 9 are fed to contact the die portions 12 and 13 in advance of the molding station C so that they will be drawn into the die sections before the thermoplastic material is pressed together at the peripheral edge of the bottle, and the sheet 9 is shown fed to the die wheel so that it may receive the neck of a bottle.

The dies may be made of porous ceramic or metal or suitable material for deep drawing and a vacuum is admitted to the die sections 12 and 13 through radial vacuum lines 18 and 19 from control valves 16 and 17. The control valves may be of any suitable type such as being connected to a vacuum manifold at the center of the rolls 10 and 11 and having ports which connect the radial suction lines 18 and 19 to the manifolds at the time when the plastic sheets are laid over the die sections 12 and 13.

The necks of the bottles are not formed in the dies but are pre-formed and are supplied to the molding station C to be heat joined to the bottles at the time that the bottle halves are joined to each other.

The bottle necks N are supplied to a bottle neck conveyor 22 at station A, which picks up individual bottle necks from a neck container 23 and carries them to place them in the individual bottle neck recesses 14 on the die roll 11. For convenience the sheet 9 is fed to the wheel in advance of positioning the bottle necks so that the necks are laid against the inner surface of the sheet. Other arrangements are of course contemplated with the sheets satisfactorily and sealingly connected to the neck. Suction openings or perforations, not shown, may be provided in the neck recesses 14 for holding the bottle necks to the die roll 11. The bottle necks may be shaped so that the plastic sheet 9 overlaps the material of the bottle neck as it is laid over the die recess 13, and the upper sheet 8 overlaps the bottle neck as it moves into the molding station C.

The sheets 8 and 9 are still in the plastic state and are readily formed by being drawn into the die openings, and sheets on the order of 50 mil thickness are well suited although the material of the bottle necks with the present arrangement can be made thicker to afford rigidity for connection to the top of the bottle and for capping.

For joining the sections of the bottle together and edge heat sealing means 21, FIGURE 3, is provided which is heated at the molding station C when the bottle sections are brought together. This embedded heating element 21 extends around the neck of the bottle so that the material of the sheets is simultaneously heat welded to the bottle neck. The embedded heating member 21 may be an electrical resistance wire connected to a circuit which is closed briefly as the bottles pass through the molding station C and the temporarily molded thermoplastic adjacent the wires 21 is cooled as soon as the bottles pass out of the molding station and the molds separate on the off running side of the wheels or rolls 10 and 11. The bottles will remain interconnected by the sheet material extending therebetween to form webs 25 connecting the bottle bodies 26 thus providing an interconnected chain of bottles.

The bottles are then carried to a trimming station D having a lower supporting roll 28 and an upper trimming knife 27. At the trimming station the flange of sheet material at the bottom end of the bottle (the area shown at $x$ in FIGURE 3 is trimmed off to drop down into a scrap collector 28a. If trimming is required at the upper end of the bottle (the area shown at $y$) this can also be performed at the trimming station D. If the area $y$ is trimmed, a trimming cutter wheel is provided which has pockets so as not to cut the necks and the wheel is synchronized with the bottles.

The bottles are then still interconnected by the webs 25 therebetween and passed through an uprighting station E wherein they are twisted through 180° with their necks facing upwardly. This may usually be provided by a smooth cam 29 which turns the bottles.

The interconnected bottles then pass to a filler and top capping station F. Filling may be provided by filling guide means 34 and caps provided from a strip of paper or foil 31 fed from a supply roll 30 with the trim being rolled onto a waste roll 32 and the caps punched from the material 31 by punch 33. As an alternate arrangement rotary screw on caps may be supplied. The station F may include control mechanisms 35 for controlling the quantity or weight of material filled into the bottle and the travel of the bottle may be temporarily delayed at the filling and capping station F, or the filling and capping mechanism may have horizontal reciprocating motion to move a short distance of travel with each bottle until the filling and capping is completed. With this arrangement the entire mechanism may be driven in uniform motion at a uniform velocity, and the die rolls 11 and 12 may be rotated uniformly.

Following the filling and capping station F is a vertical stripper G where the bottles are stripped from the web material which interconnects them and are dropped downwardly to a bottle receiving guide 37 into a packaging container 38 supported on a conveyor 39. A rotary vertically reciprocating trimming knife 36, for example, may pass down vertically between the last bottle in the line and the previous bottle to trim off the web material and permit it to drop onto a scrap conveyor 40.

Generally before the bottles are filled they are supported by the webs that extend between them, and after filling a lower support 41 may be provided, although the webbing serves to maintain the bottles in alignment and in accurately spaced relationship, and to prevent individual bottles from tipping or cocking.

In summary, the bottles are formed continuously in mechanism operating at a uniform speed with continuous thermoplastic sheets or webs 8 and 9 fed between die wheels 10 and 11 and drawn into chill molds 12 and 13. Pre-cast necks for the bottles are brought up to the molding station C and joined to the bottles at the time the halves of the bottle bodies are joined by a heat ring 21. The bottles subsequently pass through a trimming station D which trims the scrap off the ends, to uprighting station E where the neck is turned upwardly, to a filling and capping station F where they are filled and closed, and to a vertical stripper G where the webs between them are cut so that the completed and filled bottle may be dropped downwardly to be packaged and carried away by packaging conveyor 39.

Various types of plastics may be employed for the bottles including polyethylene and other thermoplastics such as cellulose acetates, acrylic resins, vinyl ester resins, styrene resins and rubber compounds and other materials suited to thermoplastic molding. A temperature control may be provided for the die molds in advance of the location where the sheets of thermoplastic are received so that proper chilling of the sheet material will occur after it has been drawn into the mold cavity. In addition to applying paper or foil, or screw type caps, sealed plastic caps may be applied at the filling and closing station, and cutting of the excess material from the bottles may be accomplished by sharpened cutter knives or by heated knives which leave a smooth seam.

The bottles may be formed to any desired shape, which will in part be determined by the contents to be filled and the material chosen may also be in part dictated by the material to be filled; generally the plastic chosen will be the least expensive for the purposes required dependent on strength and size, and will be inert to the contents. Plastic bottles of generally circular cross-sectional shape are preferably employed because of their ease of handling and removal from the die sections although bottles of elliptical, substantially square or rectangular or regular cross-section are similarly suitable in the practice of the invention and any size or shape which may be removed by stripping from the die cavities may be employed and arrangements may be employed for heat forming or heat attaching labels or markings in the neck or bottle body in the molds at the forming station C.

FIGURE 4 illustrates the completed bottle having a body 42 with a neck portion 43. The plastic of the body portion is turned up in a flange 44 heat sealed to the base of the neck portion. The body wall 45 may have a slight ridge or seam where the halves of the body portion will have been brought together in the wheels 10 and 11 but the size of this seam can be controlled. The completed finished bottle is strong and well adapted for holding various types of contents and is particularly advantageous because of the inert properties of the plastic, and the inexpensive nature of the material, and method of manufacturing. The top of the neck 43 can be threaded for a threaded type of closure or can be flanged for a snap-on closure or other closures may be employed as above described.

Thus it will be seen that I have provided a method and mechanism for continuously manufacturing and filling completed bottles. The continuous operation is well adapted to high speed operation and meets the objectives and advantages above set forth. The arrangement is well suited to the bottling of food stuffs and other materials which must be kept contamination free since the entire process may be performed within an enclosure so that the plastic material is extruded and formed into a closed bottle without requiring exposure to ambient air. As it will be observed the method and apparatus is also well suited to forming and filling containers for materials dangerous to personnel such as acid and corrosive materials.

The bottle bodies are formed of a relatively inexpensive light weight uniform thickness extruded sheet plastic with the neck being selectable of adequate weight and thickness for lending rigidity to the bottle top for capping, and the scrap material can be immediately and easily reprocessed for re-extrusion. In some instances it is of course possible to form the neck of the bottle simultaneously with the bottle body on the mold.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A mechanism for forming plastic bottles comprising, a split die having opposed die members,
means supplying opposed continuous sheets of plastic between said die members,
means providing a pressure differential across the sheets forcing the material into the die members,
means continuously supplying bottle necks to said die members so that the sheets are joined to the necks in the die,
and means trimming excess material from bottles formed in the die members.

2. A mechanism for forming plastic bottles comprising, a pair of die wheels having split die members thereon positioned for bringing pairs of split die members together in closed molding relationship at a molding station,
means feeding a pair of continuous plastic sheets between said wheels at said molding station,
means providing a pressure differential across the sheets forcing the material into the die members,
means continuously supplying bottle neck to said die members so that the sheets are joined to the necks in the die,
and means trimming excess material from bottles formed in the die members.

3. A mechanism for forming plastic bottles comprising, a pair of die wheels having split die members thereon positioned for bringing pairs of split die members together in closed molding relationship at a molding station, a pair of plastic sheet extruders feeding continuous sheets of pliable plastic between said wheels at said molding station, means providing a pressure differential across the sheets forcing the material into the die members, means continuously supplying bottle necks to said die members so that the sheets are joined to the necks in the die, and means trimming excess material from bottles formed in the die members.

4. A mechanism for forming plastic bottles comprising, a pair of die wheels having a split die members thereon positioned for bringing pairs of die members together in closed molding relationship at a molding station, suction passages leading to said die members, means supplying opposed continuous sheets of plastic between said die members, a first valve means controlling suction in the die members for drawing the sheets into the die members at the molding station releasing bottles formed from the sheets after the molding station, means supplying bottle necks to one of said die members in advance of said molding station, a second valve means controlling suction to an area of the die members at the location where the necks are received for holding the necks and carrying them to the molding station, and means trimming excess material from bottles formed in the die members.

5. A mechanism for forming plastic bottles comprising, a split die having opposed die members, means supplying opposed continuous sheets of plastic between said die members, means providing a pressure differential across the sheets forcing the material under the die members, means supplying bottle necks to said die members so that the sheet are joined to the necks in the die, said bottles being interconnected by webs of sheet material therebetween, trimming means receiving bottles from the die interconnected by the webs of sheet material therebetween and cutting excess material from the bottle end only, and means subsequently trimming all excess material from the bottles including the webs between the bottles.

6. A mechanism for forming plastic bottles comprising, a split die having opposed die members, means supplying opposed continuous upper and lower sheets of plastic between said die members, means providing a pressure differential across the sheets forcing the material into the die members, means supplying bottle necks into horizontal position to said die members so that the sheets are joined to the necks in the die and the bottles are interconnected by webs of sheet material therebetween, a turning means turning the interconnected bottles through 90° to be upright with the bottom of the bottle facing downwardly, and means subsequently trimming excess material from the bottles.

7. A mechanism for forming plastic bottles comprising, a split die having opposed die members, means supplying opposed continuous upper and lower sheets of plastic between said die members, means providing a pressure differential across the sheets forcing the material into the die members, means supplying bottle necks into horizontal position to said die members so that the sheets are joined to the necks in the die and the bottles are interconnected by webs of sheet material therebetween, a turning means turning the interconnected bottles through 90° to be upright with the bottom of the bottles facing downwardly, filling and closing means following said turning means filling and closing the interconnected bottles, and means for subsequently cutting excess material from the bottles.

8. A mechanism for forming plastic bottles comprising, a split die having opposed die members, means supplying opposed continuous upper and lower sheets of plastic between said die members, means providing a pressure differential across the sheets forcing the material into the die members, means supplying bottle necks into horizontal position to said die members so that the sheets are joined to the necks in the die and the bottles are interconnected by webs of sheet material therebetween, a turning means turning the interconnected bottles through 90° to be upright with the bottom of the bottles facing downwardly, filling and closing means following said turning means filling and closing the interconnected bottles, and a vertical stripper cutting the individual bottles from the interconnecting webs.

9. A mechanism for forming plastic bottles comprising, a split die having opposed die members, means supplying opposed continuous upper and lower sheets of plastic between said die members, means providing a pressure differential across the sheets forcing the material into the die members, means supplying bottle necks into horizontal position to said die members so that the sheets are joined to the necks in the die and the bottles are interconnected by webs of sheet material therebetween, a turning means turning the interconnected bottles through 90° to be upright with the bottom of the bottles facing downwardly, filling and closing means following said turning means filling and closing the interconnected bottles, a vertical stripper cutting the individual bottles from the interconnecting webs, and a packaging conveyor below said stripper receiving bottles cut from the webs for packaging the bottles.

10. A mechanism for forming plastic bottles comprising in combination, a pair of opposed die wheels having die halves therein with the wheels rotatable to bring the die halves into a molding station, upper and lower extruders feeding horizontal opposed sheets to the wheels at said forming station, a bottle neck conveyor delivering bottle necks to the lower die wheel in advance of said forming station, a first valve controlled vacuum means drawing the plastic sheets into the die heads at the forming station, and a second valve controlled vacuum means drawing the bottle necks to the lower die wheel and carrying them into the forming station, said bottles being released by the wheels following the forming station and being interconnected by webs of sheet materials, trim means following said forming station for removing excess plastic sheets from the lower ends of the bottles, uprighting means following the trimming means rotating the web interconnected bottles through 90° to an upright position, filling means following the uprighting means filling the bottles, closing means forming a closing cap and attaching it to the filled bottle, a vertical stripper following the filling means for carrying bottles vertically downwardly and stripping them from the webs interconnecting the bottles, scrap collecting means for collecting the webs removed from the bottles, and a packaging conveyor receiving the bottles and packaging them after being removed from the interconnecting webs.

11. The method of forming plastic bottles which comprises passing opposed continuous sheets between split dies, shaping the halves of the bottle in the dies, continuously supplying bottle necks to the die members so that the sheets are joined to the neck in the die, sealing the halves together with successive bottles being interconnected by webs, trimming excess material from the bottle end only, filling and closing the interconnected bottles, and stripping individual bottles from the web.

References Cited

UNITED STATES PATENTS

| 2,387,747 | 10/1945 | Cowley | 53—30 X |
| 2,768,106 | 10/1956 | Sartakoff | 156—292 X |
| 2,918,168 | 12/1959 | Sanni | 206—56 |

TRAVIS S. McGEHEE, *Primary Examiner.*

FRANK E. BAILEY, *Examiner.*

R. J. ALVEY, P. H. POHL, *Assistant Examiners.*